(12) United States Patent
Magarill et al.

(10) Patent No.: US 7,090,357 B2
(45) Date of Patent: Aug. 15, 2006

(54) COMBINED LIGHT SOURCE FOR PROJECTION DISPLAY

(75) Inventors: Simon Magarill, Cincinnati, OH (US); Boris Ardashnikov, Cincinnati, OH (US); R. Edward English, Jr., Cincinnati, OH (US)

(73) Assignee: 3M Innovative Properties Company, St. Paul, MN (US)

( * ) Notice: Subject to any disclaimer, the term of this patent is extended or adjusted under 35 U.S.C. 154(b) by 81 days.

(21) Appl. No.: 10/745,000

(22) Filed: Dec. 23, 2003

(65) Prior Publication Data

US 2005/0134811 A1    Jun. 23, 2005

(51) Int. Cl.
G03B 21/28    (2006.01)

(52) U.S. Cl. .................... 353/94; 353/81; 362/234; 362/236

(58) Field of Classification Search ................ 353/31, 353/33, 34, 37, 98, 99, 81; 349/5, 6, 7, 8, 349/9; 362/555, 559, 84, 227, 230, 231, 362/234, 236, 253; 359/639, 640
See application file for complete search history.

(56) References Cited

U.S. PATENT DOCUMENTS

| | | |
|---|---|---|
| 1,428,662 A | 9/1922 | Walter |
| 1,451,893 A | 4/1923 | Walter |
| 2,587,956 A | 3/1952 | Roy |
| 3,756,688 A | 9/1973 | Hudson et al. |
| 3,984,178 A | 10/1976 | Bergqvist |
| 4,915,489 A | 4/1990 | Minko |
| 5,055,892 A | 10/1991 | Gardner et al. |
| 5,285,318 A | 2/1994 | Gleckman |
| 5,398,086 A | 3/1995 | Nakano |
| 5,428,365 A | 6/1995 | Harris |
| 5,442,414 A | 8/1995 | Janssen |
| 5,557,353 A | 9/1996 | Stahl |
| 5,592,188 A | 1/1997 | Doherty |
| 5,625,738 A | 4/1997 | Magarill |
| 5,633,737 A | 5/1997 | Tanaka |
| 5,662,401 A | 9/1997 | Shimizu |
| 5,719,706 A | 2/1998 | Masumoto |
| 5,757,341 A | 5/1998 | Clarke |

(Continued)

FOREIGN PATENT DOCUMENTS

EP    0 083 527    7/1983

(Continued)

OTHER PUBLICATIONS

U.S. Appl. No. 10/701,201, filed Nov. 4, 2003.

(Continued)

*Primary Examiner*—William C. Dowling
(74) *Attorney, Agent, or Firm*—George W. Jonas (57) ABSTRACT

High pressure mercury arc lamps are commonly used as the illumination source in many projection systems. Such lamps may be deficient in either output power or spectrum, and so it is desirable to combine the light from the lamp with light from a second light generator. The second light generator may be another mercury lamp or a solid state source, such as one or more light emitting diodes. Different ways of combining light from two light generators are described. The second light source may be an arrangement of a number of red LEDs that supplements the red light produced by the mercury light. A tunnel integrator may be used to homogenize the combined light beam and to reduce the angular separation between the light beams from the two light generators.

39 Claims, 8 Drawing Sheets

U.S. PATENT DOCUMENTS

| | | | |
|---|---|---|---|
| 5,764,319 | A | 6/1998 | Nishihara |
| 5,782,553 | A | 7/1998 | McDermott |
| 5,796,526 | A | 8/1998 | Anderson |
| 5,839,823 | A | 11/1998 | Hou |
| 5,863,125 | A * | 1/1999 | Doany ............... 353/84 |
| 5,900,981 | A | 5/1999 | Oren |
| 5,900,982 | A | 5/1999 | Dolgoff |
| 5,969,872 | A | 10/1999 | Oren |
| 5,971,545 | A | 10/1999 | Haitz |
| 5,987,793 | A | 11/1999 | Ebine |
| 5,997,150 | A | 12/1999 | Anderson |
| 6,028,694 | A | 2/2000 | Schmidt |
| 6,038,005 | A | 3/2000 | Handschy |
| 6,061,183 | A | 5/2000 | Nakai |
| 6,102,552 | A | 8/2000 | Tullis |
| 6,104,458 | A | 8/2000 | Fukuda |
| 6,104,541 | A | 8/2000 | Otomo |
| 6,139,156 | A | 10/2000 | Okamori et al. |
| 6,144,426 | A | 11/2000 | Yamazaki |
| 6,177,761 | B1 | 1/2001 | Pelka |
| 6,196,699 | B1 | 3/2001 | Stanton |
| 6,201,629 | B1 | 3/2001 | McClelland |
| 6,224,216 | B1 | 5/2001 | Parker et al. |
| 6,227,669 | B1 | 5/2001 | Tiao et al. |
| 6,236,512 | B1 | 5/2001 | Nakai |
| 6,252,636 | B1 | 6/2001 | Bartlett |
| 6,254,237 | B1 | 7/2001 | Booth |
| 6,280,058 | B1 | 8/2001 | Horigome |
| 6,318,863 | B1 | 11/2001 | Tiao et al. |
| 6,330,039 | B1 | 12/2001 | Matsui |
| 6,332,688 | B1 | 12/2001 | Magarill |
| 6,336,724 | B1 * | 1/2002 | Shouji et al. ............ 353/20 |
| 6,341,867 | B1 | 1/2002 | Itoh |
| 6,398,389 | B1 | 6/2002 | Bohler et al. |
| 6,402,347 | B1 | 6/2002 | Maas |
| 6,412,953 | B1 | 7/2002 | Tiao et al. |
| 6,419,365 | B1 * | 7/2002 | Potekev et al. ............ 353/98 |
| 6,459,835 | B1 | 10/2002 | Nagaoka et al. |
| 6,469,755 | B1 | 10/2002 | Adachi |
| 6,471,358 | B1 | 10/2002 | Itoh et al. |
| 6,483,196 | B1 | 11/2002 | Wojnarowski |
| 6,491,443 | B1 | 12/2002 | Serizawa et al. |
| 6,499,863 | B1 | 12/2002 | Dewald |
| 6,505,939 | B1 * | 1/2003 | Bierhuizen et al. ........ 353/94 |
| 6,527,419 | B1 | 3/2003 | Galli |
| 6,547,400 | B1 | 4/2003 | Yokoyama |
| 6,547,423 | B1 | 4/2003 | Marshall |
| 6,561,654 | B1 * | 5/2003 | Mukawa et al. ............ 353/31 |
| 6,570,190 | B1 | 5/2003 | Krames |
| 6,591,037 | B1 | 7/2003 | Yonekubo |
| 6,595,648 | B1 | 7/2003 | Woodgate et al. |
| 6,623,122 | B1 | 9/2003 | Yamazaki et al. |
| 6,639,572 | B1 | 10/2003 | Little |
| 6,644,814 | B1 | 11/2003 | Ogawa |
| 6,646,806 | B1 * | 11/2003 | Bierhuizen ............... 359/618 |
| 6,657,236 | B1 | 12/2003 | Thibeault |
| 6,672,724 | B1 * | 1/2004 | Peterson et al. ........... 353/81 |
| 6,688,747 | B1 * | 2/2004 | Wichner et al. ............ 353/29 |
| 6,726,329 | B1 * | 4/2004 | Li et al. .................... 353/20 |
| 6,733,139 | B1 * | 5/2004 | Childers et al. ............ 353/94 |
| 6,788,471 | B1 | 9/2004 | Wagner |
| 6,843,566 | B1 * | 1/2005 | Mihara ...................... 353/29 |
| 2001/0022613 | A1 | 9/2001 | Matsui |
| 2001/0046131 | A1 | 11/2001 | Hoelen |
| 2001/0048493 | A1 | 12/2001 | Swanson et al. |
| 2001/0048560 | A1 | 12/2001 | Sugano |
| 2002/0003636 | A1 | 1/2002 | Conner |
| 2002/0003669 | A1 | 1/2002 | Kedar et al. |
| 2002/0093743 | A1 | 7/2002 | Miyamae |
| 2002/0097000 | A1 | 7/2002 | Muthu |
| 2002/0105807 | A1 | 8/2002 | Loughrey |
| 2002/0114157 | A1 | 8/2002 | Fu-Ming et al. |
| 2002/0145708 | A1 | 10/2002 | Childers et al. |
| 2002/0154277 | A1 | 10/2002 | Mukawa et al. |
| 2002/0159036 | A1 | 10/2002 | Yamagishi |
| 2002/0186350 | A1 | 12/2002 | Peterson |
| 2002/0191395 | A1 | 12/2002 | Fleury |
| 2003/0016539 | A1 | 1/2003 | Minano |
| 2003/0043582 | A1 | 3/2003 | Chan |
| 2003/0133080 | A1 | 7/2003 | Ogawa |
| 2003/0147055 | A1 | 8/2003 | Yokoyama |
| 2003/0193649 | A1 | 10/2003 | Seki |
| 2003/0214815 | A1 | 11/2003 | Ishida et al. |
| 2004/0004176 | A1 | 1/2004 | Liang |
| 2004/0042212 | A1 | 3/2004 | Du et al. |
| 2004/0062044 | A1 | 4/2004 | Kazunari |
| 2004/0062045 | A1 | 4/2004 | Chang |
| 2004/0080938 | A1 | 4/2004 | Holman et al. |
| 2004/0114250 | A1 | 6/2004 | Kato |
| 2004/0174501 | A1 * | 9/2004 | Slobodin et al. ............... 353/94 |
| 2004/0202007 | A1 | 10/2004 | Yagi et al. |
| 2004/0207816 | A1 | 10/2004 | Manabu et al. |
| 2005/0094401 | A1 | 5/2005 | Magarill |
| 2005/0134811 | A1 | 6/2005 | Magarill |
| 2005/0174658 | A1 * | 8/2005 | Long et al. ................. 359/833 |
| 2005/0174768 | A1 | 8/2005 | Conner |
| 2005/0174771 | A1 | 8/2005 | Conner |
| 2005/0174775 | A1 | 8/2005 | Conner |

FOREIGN PATENT DOCUMENTS

| | | |
|---|---|---|
| EP | 0 322 070 | 6/1989 |
| EP | 0 493 800 | 7/1992 |
| EP | 0 587 371 | 3/1994 |
| EP | 0 740 178 | 10/1996 |
| EP | 0 795 771 | 9/1997 |
| EP | 0 837 350 | 4/1998 |
| EP | 0 881 514 | 12/1998 |
| EP | 1 003 064 | 5/2000 |
| EP | 1 052 856 | 11/2000 |
| EP | 1 347 653 | 9/2003 |
| EP | 1 357 333 | 10/2003 |
| EP | 1 363 460 | 11/2003 |
| EP | 1 398 659 | 3/2004 |
| GB | 1 195 547 | 6/1970 |
| JP | 09-018072 | 1/1997 |
| JP | 10-123512 | 5/1998 |
| JP | 11-231316 | 8/1999 |
| JP | 200305040 | 11/2000 |
| JP | 2002/133932 | 5/2002 |
| JP | 2002-177218 | 6/2002 |
| JP | 2002-184206 | 6/2002 |
| JP | 2003-330109 | 11/2003 |
| JP | 2005-128236 | 5/2005 |
| TW | 531 662 B | 5/2003 |
| WO | WO 2002/048775 | 6/2002 |
| WO | WO 2002/065184 | 8/2002 |
| WO | WO 2003/56876 | 7/2003 |
| WO | WO 2004/043076 | 5/2004 |
| WO | WO 2004/107751 | 12/2004 |
| WO | WO 2004/109366 | 12/2004 |
| WO | WO 2005/078496 | 8/2005 |

OTHER PUBLICATIONS

Jacobson, et al., "Novel Compact Non-Imaging Collectors for LED Arrays", Illumitech, Inc., bjacobson@illumitech.com.

Secondary Optics Design Considerations for SuperFlux LEDs, application brief AB20-5, Appendix 5A, pp. 5-22.

Steve Paolini, Gerard Harbers, Matthijs Keuper, Lumileds, Light from Silicon Valley, High-Power LED Illuminators in Projection Displays, pp. 1-19.

Gerard Harbers, Wim Timmers, Willem Sillevis-Smitt, LED Backlighting for LCD HDTV, Journal of the SID, Oct. 4, 2002, pp. 347-350.

LumiBright Light Engine, Innovations in Optics, Inc, Woburn, Massachusetts.

Laikin, Milton, "Lens Design-Third Edition, Revised and Expanded", Table of Contents, pp. 305-312, Marcel Dekker, New York, 2001.

Lumileds Lighting, U.S., LLC, "Power Light Source Luxeon™ Emitter", Document # DW25 (Jul. 25, 2003) pp. 1-12.

Smith, Warren J. "Modern Optical Engineering The Design of Optical Systems", McGraw-Hill Third Edition, (2000) pp. 245-247, 470-474.

Stupp, Edward H. and Brennesholtz, Matthew S. "Projection Displays" Modeling Lumen Throughput "Etendue at a flat surface" John Wiley & Sons, Inc. III Series (1999) p. 244-245.

Melles Griot: "Specifying Laser Diode Optics" Online! 2000, 2002 XP002323875, Section "Focusing Lenses For Fiber Optics" Lines 19-23, Figures 3, 4.

Light Emitting Diodes 2003, Oct. 15-17, 2002, "Optical Design for LED Based Devices" Juan Manuel Teijido, Sony International (Europe) GmbH, Sony Corporate Laboratories Europe.

\* cited by examiner

COMBINED LIGHT SOURCE FOR PROJECTION DISPLAY

FIELD OF THE INVENTION

The invention relates to optical systems, and more particularly to projector systems that use two or more light sources.

BACKGROUND

Projection systems, used for projecting an image on to a screen, use several different components for providing efficient illumination of the image display unit. Projection systems typically use a lamp to generate the illumination light, with several optical elements being disposed between the lamp and the image display unit to efficiently transfer the light from the lamp to the image display unit. The image display unit may use different mechanisms for imposing an image on the incident beam of light. For example, the image display unit may use absorption, as with a photographic slide, polarization, as with a liquid crystal display, or by the deflection of light, as with a micromechanical array of individually addressable, tiltable mirrors. Some image display units require that differently colored components of the image be imposed by splitting the light beam into beams of primary colors, imposing separate images on the primary color beams and then recombining the primary color images to produce the final image.

Image brightness is a key parameter for characterizing a projection system. Image brightness may be affected by several factors, such as the brightness of the lamp, the efficiency of collecting the light from the lamp, the efficiency of homogenizing the light beam, the efficiency of relaying the light to the image display unit, and the efficiency of imposing the image on the light beam. It is often desirable to be able to form the image to be as bright as possible. When the étendue of the projection system, however, limits the amount of light in the image, the solution to increased brightness is to use a more powerful lamp. Étendue is the product of the imager area and the solid angle determined by the f-number of the optical system. More powerful lamps are expensive and often have a shorter lifetime. Also, more powerful lamps tend to have a larger arc, which reduces the geometrical efficiency of light collection.

SUMMARY OF THE INVENTION

In view of the above, there is a need to increase the brightness of the light source used in illuminating a projection system while maintaining long lifetime and high light collection efficiency.

In addition, high pressure mercury arc lamps are typically used for illuminating projection systems, since they have a reasonably long lifetime and a short arc length that permits high geometrical light collection efficiency. The high pressure mercury arc lamp, on the other hand, produces light having a spectrum that is rich in blue and green intensity, but relatively low in red intensity. Accordingly, to achieve a desirable color temperature in the image light, a significant portion of the blue and green light is unused, which lowers the overall system efficiency. There is a need to reduce the amount of blue and green light emitted from the lamp that is not used in the image light beam.

In view of the above, one particular embodiment of the invention is directed to a projector system comprising a light source and at least one image display unit. The light source comprises a first light generator producing first light. A first reflector is disposed to collect at least part of the first light and to direct the collected first light in a first direction. A second light generator produces second light. A second reflector is disposed to collect at least part of the second light and to direct the collected second light in a second direction. A light combiner combines the first light and the second light to produce a combined light beam. The at least one image display unit is illuminated by at least a part of the combined light beam from the light source. The at least one image display unit imposes an image on the at least a part of the combined light beam to form an image beam.

Another embodiment of the invention is directed to a light source unit for a projection system. The unit comprises a first light generator that produces first light. A first reflector is disposed to collect at least part of the first light and to direct the collected first light in a first direction. A second light generator produces second light. A second reflector is disposed to collect at least part of the second light and to direct the collected second light in a second direction. A light combiner combines the first light and the second light to produce a combined light beam.

Another embodiment of the invention is directed to a light source unit for a projection system. The light source unit includes a first light generator unit producing a first light beam having a first cone angle. Light in the first light beam has a relatively broad spectrum. A second light generator unit produces a second light beam separated from the first light beam. The second light beam has a second cone angle substantially equal to the first cone angle. the light in the second light beam has a relatively narrow spectrum. A light integrator is disposed to receive both the first and second light beams and to produce a combined output beam.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to optical systems and is particularly applicable to projection systems, particularly to projection systems that use liquid crystal image display units.

Figure 1:
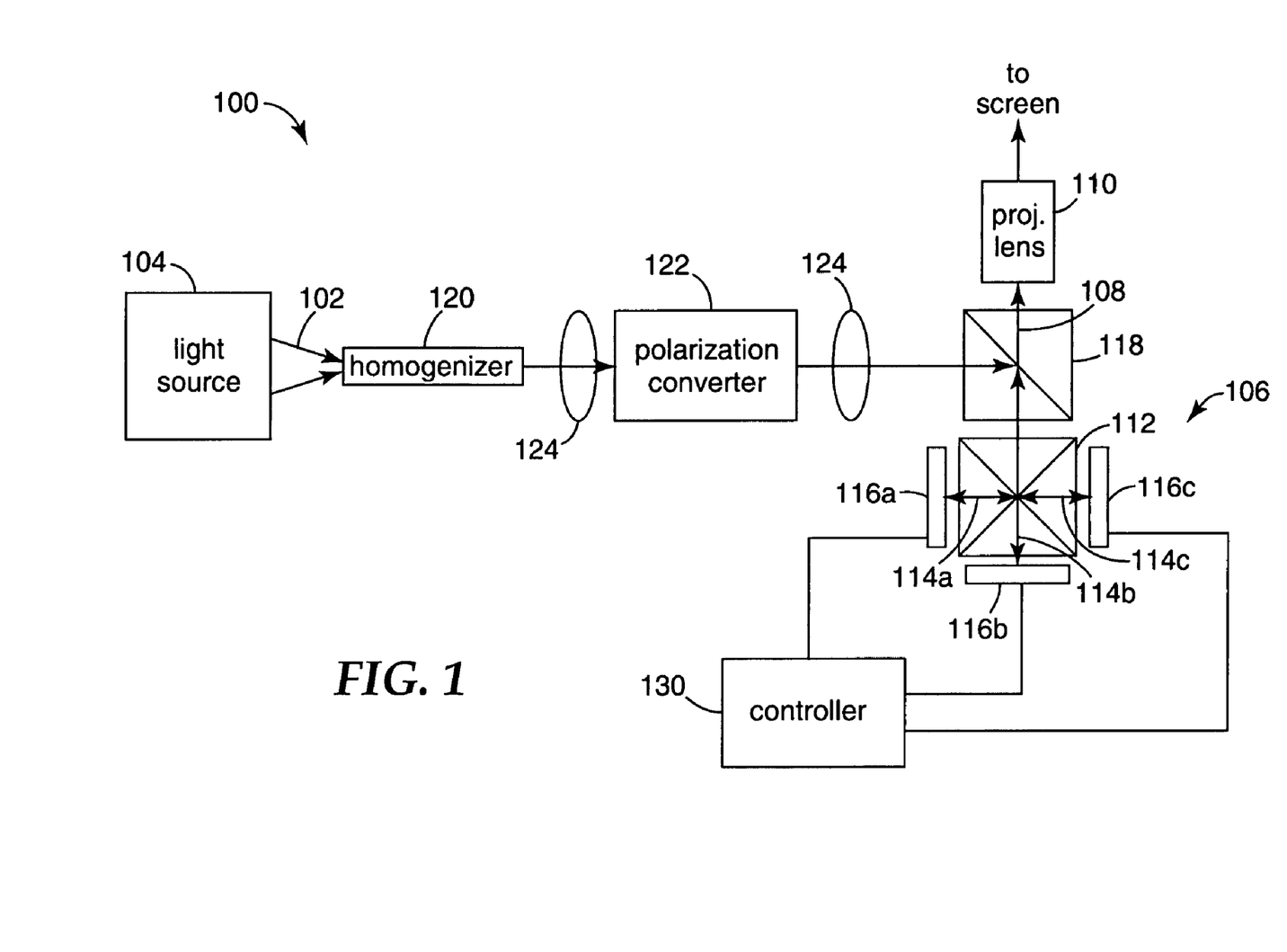
FIG. 1 schematically illustrates an embodiment of a projection system.

A schematic illustration of a projection system 100 is presented in FIG. 1. In general terms, light 102 from a light source 104 is directed to an image display device 106. Image light 108 from the image display device 106 then propagates through a projection lens system 110 for projection on a screen. The projection system may be a rear projection system, for example as is commonly found in rear projection televisions, or may be a front projection system, for example as is found in front projection televisions and display systems.

In the illustrated embodiment, the image display device 106 comprises a color separation/combiner 112 that splits the light 102 into beams of three different primary colors 114*a*, 114*b* and 114*c*, for example red, green and blue, each of which is directed to an associated reflective image display unit 116*a*, 116*b* and 116*c*. The color separation/combiner 112 may be an x-prism, as illustrated, or may include other configurations of prism, such as a Philips prism or the like. In another embodiment, not shown, the color separation/combiner may comprise a combination of dichroic color separators and or color prisms. This approach permits the projection system 100 to form images in each of the primary colors: combination of the primary color images in the color separator/combiner forms a full color image that is projected to the screen.

In some other embodiments, the primary color images are not formed simultaneously, but may be formed sequentially. In such systems, there is typically no color separator/combiner. Before incidence on the image display device, however, the light passes through a color filter, so that light of only one primary color is incident on the image display device at any one time. The image display device is synchronously controlled to impose an image appropriate to the color of the currently incident light.

Images in the different primary colors are formed in sequence and projected to the screen. Where the sequence of color change is sufficiently fast, the viewer's eye integrates the images of different primary color and perceives a full color image.

Different types of image display devices may be used. One simple type of image display device is a photographic slide. This requires no color separation. Other types of image display device permit the image imposed on the light to be actively changed. Examples of such image display devices include liquid crystal display (LCD) units, including liquid crystal on silicon (LCoS) units, and micromechanical displays. One example of a micromechanical display is based on an array of individually addressable tiltable mirrors, in the DLP™ range of products supplied by Texas Instruments, Plano Tex.

The image display device 106 may be transmissive, where the image light is transmitted through the device. The image display device 106 may instead be reflective, as illustrated, where the image light is reflected from the device. The image display device 106 may even be transflective, using light that is both reflected by the device and transmitted through the device. A polarizing beamsplitter (PBS) 118 is often used to separate the incoming light from the reflected image light from an image display device that uses polarization modulation for imposing the image on the incident light.

The light 102 from the light source 104 may be passed through one or more homogenizer devices 120 that make the intensity profile of the light beam more uniform. One commonly used type of homogenizer device is a tunnel integrator. A tunnel integrator is commonly a tube or rod that is often, but is not restricted to being, rectangular in cross-section. Light passes into the integrator through the entrance aperture and undergoes several reflections at the walls before passing out through the exit aperture. The effect of the multiple reflections is to uniformize the intensity profile of the light at the exit aperture relative to the intensity profile at the input aperture. The light may be reflected within the tunnel integrator via total internal reflection or using front surface reflection. A hollow tunnel integrator does not refract the incoming light, and so may be able to homogenize the light over a shorter distance than an internally reflecting tunnel integrator.

The light from a light source such as a lamp is typically unpolarized. Several types of image display device, however, such as LCD-type image display devices, rely on the incident light being polarized. One way to polarize the light is simply to pass the light through a pre-polarizer and/or a PBS 118. This, however, may result in losing 50% of the light, which is inefficient. A polarization converter 122 may be used to convert the incident light so as to increase the fraction of the light beam that is in the polarization state desired for incidence on the image display device.

The projection system 100 may include several lenses for relaying light through the device. For example, it is common to include a number of relay lenses 124 to relay an image of the output aperture of homogenizer 120 onto the surfaces of the image display devices 116*a*–116*c*. This increases the efficiency of the projection system. The image display devices 116*a*–116*c* may be connected to a controller 130, for example a microprocessor, that controls the images imposed on the light by the image display devices 116*a*–116*c*.

The projected image may be made brighter if a higher power lamp is used. Higher power lamps, however, suffer from shorter lifetime. In addition, higher power lamps typically have a larger arc, and so the geometrical collection efficiency, the efficiency of passing the light from the arc to the image display device, may be reduced. A different approach to increasing the brightness of the image is to combine the light from two light sources. This permits lower power arc lamps to be used, thus providing an increased brightness without a reduction in lifetime or geometrical collection efficiency.

Figure 2:
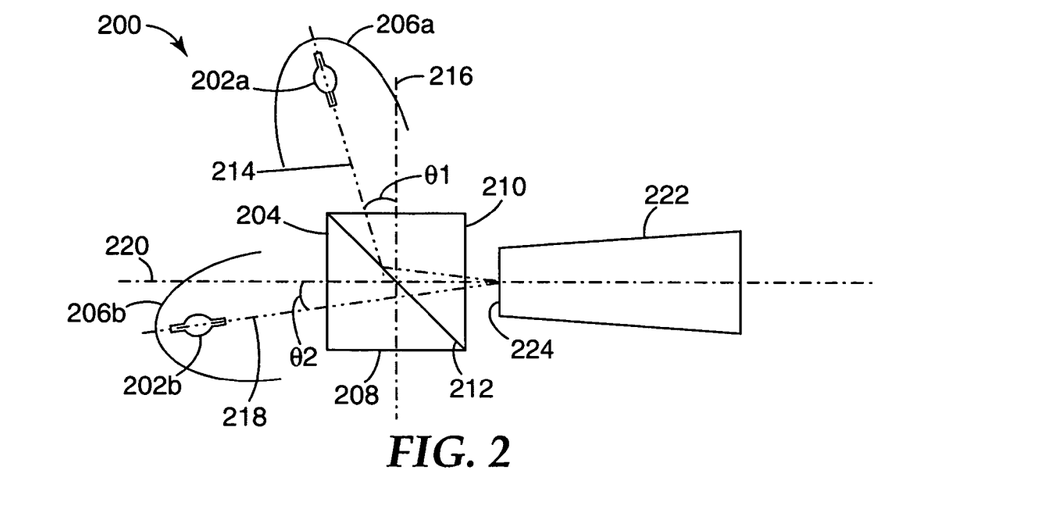
FIG. 2 schematically illustrates an embodiment of a light source in accordance with principles of the present invention.

One particular embodiment of a light source 200 that combines the light from two different light generators is schematically illustrated in FIG. 2. In this embodiment, the light source 200 combines light from two arc lamps 202a and 202b using a prism pair 204. The light from each arc lamp 202a and 202b is collected and directed towards the prism pair 204 by respective reflectors 206a and 206b. The reflectors 206a and 206b may be elliptical reflectors. The prism pair 204 comprises two prisms 208 and 210, separated by a gap 212 along the diagonal. The gap 212 may an air space. One arc lamp 202a is located to the side of prism 210 and the central ray from lamp 202a, shown as axis 214, forms an angle θ1 with axis 216. Another arc lamp 202b is positioned to the side of prism 208 and the central ray from lamp 202b, shown as axis 218, forms an angle θ2 with axis 220.

An integrator 222, such as a tunnel integrator, also sits on axis 220. The light from the first arc lamp 202a is substantially totally internally reflected within prism 210, while the light from the second arc lamp 202b is substantially transmitted through prisms 208 and 210. The entrance aperture 224 of the integrator 222 receives the light from both arc lamps 202a and 202b.

Figure 3:
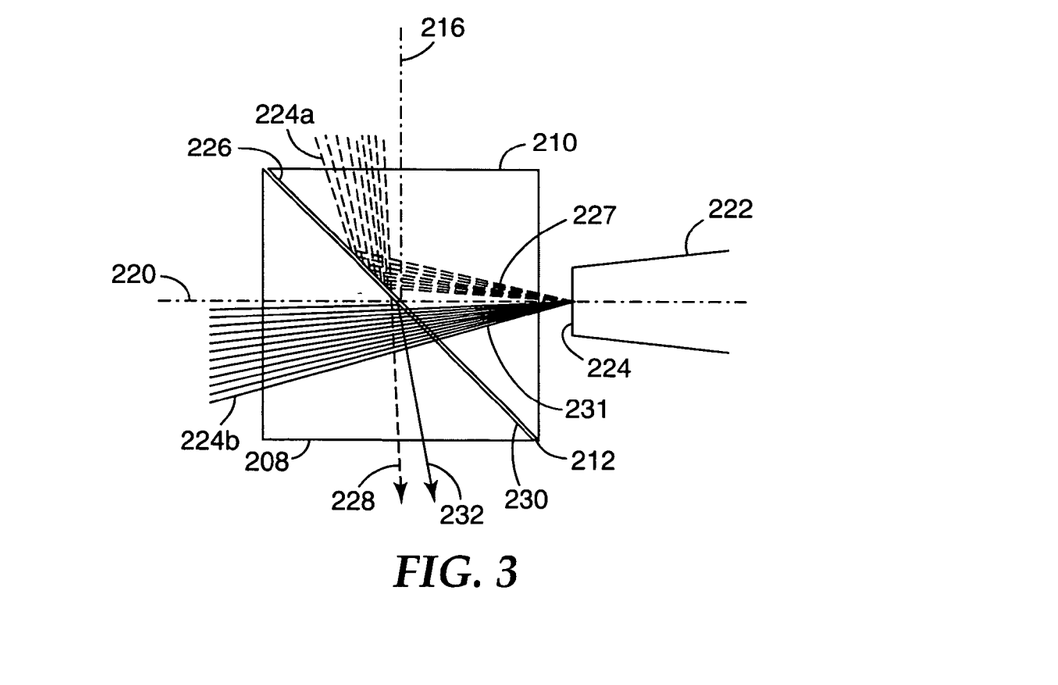
FIG. 3 schematically illustrates an embodiment of a light beam combining prism pair, shown in FIG. 2, in accordance with principles of the present invention.

The operation of the prism pair 204 is now described in greater detail, with reference to FIG. 3 which shows rays of light from each of the arc lamps 202a and 202b. Light is generally directed to the prism pair 204 from the elliptical reflectors 206a and 206b with a conical shape. The light 224a, shown in dashed lines, from lamp 202a is incident on the surface 226 of the prism 210. Most of the light 224a is incident on the surface 226 at an angle equal to, or greater than, the angle of total internal reflection within the prism 210, and is reflected toward the integrator 222 as light 227. Some of the light 224a may be incident on the surface 226 at an angle less than the angle for total internal reflection, and is transmitted through the surface 226 and the gap 212 and into the prism 208 as light 228. This light 228 is not collected by the integrator 222.

The light 224b, shown in solid lines, from lamp 202b is incident on the surface 230 of the prism 208. Most of the light 224b is incident on the surface 230 at an angle less than the angle of total internal reflection within the prism 208, and is transmitted through the surface 230, through the prism 210 and toward the integrator 222 as light 231. Some of the light 224b may be incident on the surface 230 at an angle equal to, or greater than, the angle for total internal reflection, is reflected at the surface 230 as light 232 and does not to propagate to the integrator 222. This light 232 is not collected by the integrator 222.

Thus, the prism pair 204 is effective at combining light collected by two reflectors 206a and 206b from two light generators 202a and 202b, and directed to the prism pair 204, and directing the combined light to an integrator 222. It will be appreciated that the light 227 and 231 need not come to a focus, or reach its highest intensity, exactly at the entrance aperture 224 of the integrator, although the brightness may be increased under such a condition. The reflectors 206a and 206b reduce the divergence of the light emitted from the arc lamps 202a and 202b so that a significant amount of the light enters the integrator 222. Accordingly, the light 224a and 224b may enter the integrator spread out over an area. Furthermore, it will be appreciated that although the embodiment illustrated in FIG. 2 has been described using arc lamps as the light generators, other light generators may be used, for example other types of lamps.

Figure 4A:
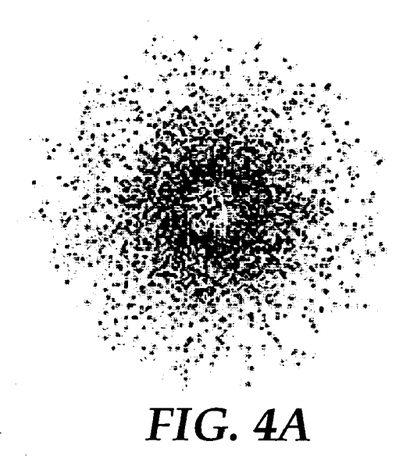
FIGS. 4A–4C schematically illustrate calculated spot diagrams of light beams before and after a tunnel integrator in an embodiment of a projection system according to principles of the present invention.
Figure 4B:
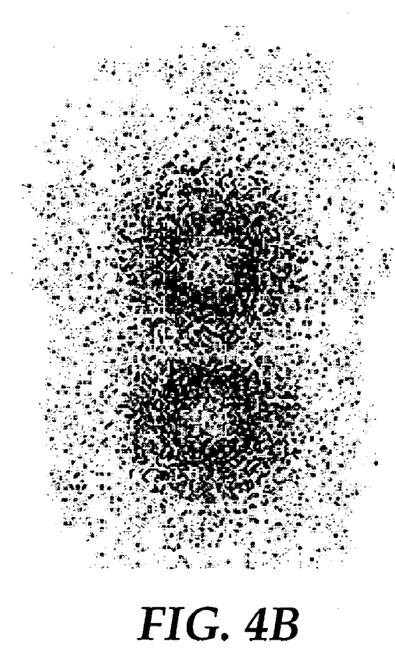

The prism pair 204 essentially permits angular combination of the light beams 227 and 231 having different angular light distributions in the integrator. This is now discussed with reference to FIGS. 4A–4C, which show calculated spot diagram light distributions in the far field that represent the angular light distribution. FIG. 4A presents a calculated view of the spot diagram for the light from a single light generator and a single reflector. FIG. 4B presents a calculated view of the spot diagram for light from the two light generators 202a and 202b after combination in the prism pair 204. As can be seen, the light from the two different light generators propagates in different directions, and there is little overlap between the two. The calculated angular separation between the two light beams is 23°.

Figure 4C:
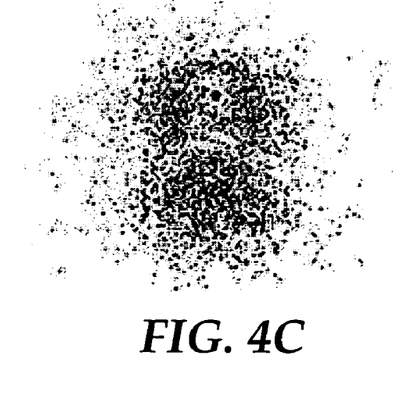
Figure 5:
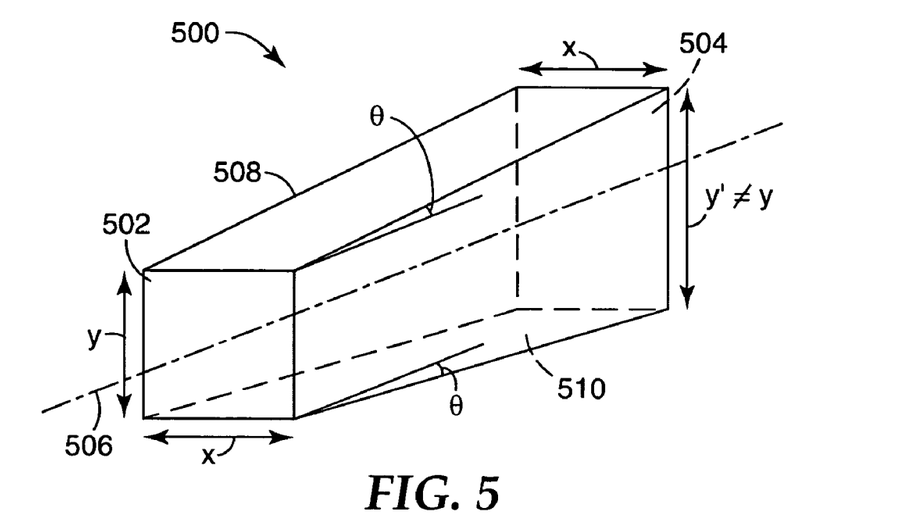
FIG. 5 schematically illustrates an embodiment of a trapezoidal tunnel integrator in accordance with principles of the present invention.

A tapered tunnel integrator may be used to reduce the angular separation between the two light beams. An example of a tapered light tunnel integrator 400 is schematically illustrated in FIG. 5, where the entrance aperture 502 has dimensions of x and y, and the exit aperture 504 has dimensions of x and y', where y'≠y. In the illustrated embodiment, the sides of the tunnel integrator 500 are straight, and two of the opposing sides of the tunnel are positioned at an angle θ relative to the axis 506. The fact that the sidewalls 508 and 510 are not parallel to the axis results in a reduction in the angular size of the light beam passing through the tunnel integrator 500. FIG. 4C presents a calculated view of the spot diagram of the light from the two light generators 202a and 202b after propagation through the tunnel integrator 500. The angular separation of the two light beams is calculated to be 12°, significantly less than that shown in FIG. 4B. In the calculations that generated FIGS. 4B and 4C, it was assumed that the tunnel integrator was 40 mm long, had an entrance window 4.5 mm×4.5 mm and an exit window 4.5 mm×7.8 mm. Accordingly, the angle, θ, of the tapered sides relative to the axis 506 was ±2.36°.

The reduction in angular separation is dependent on the angle of the tunnel integrator and on the number of reflections within the tunnel. Since the optical losses associated with the tunnel integrator increase with the number of reflections, the number of reflections and the amount by which the angular separation is reduced are left as design criteria for specific illumination systems. Tapered tunnel integrators are described in greater detail in U.S. Pat. No. 5,625,738, incorporated herein by reference.

The tunnel integrator 500 may be a hollow integrator or may be a solid integrator. Furthermore, the entrance aperture 502 need not be square and the exit aperture need not be rectangular, but may take on other shapes. In many projection systems, the exit aperture is imaged to the image display device, and so it is common for the aspect ratio of the exit aperture 504 to be the same as the aspect ratio of the image display device, otherwise the overall geometrical light collection efficiency of the projection system may be reduced.

Figure 6:
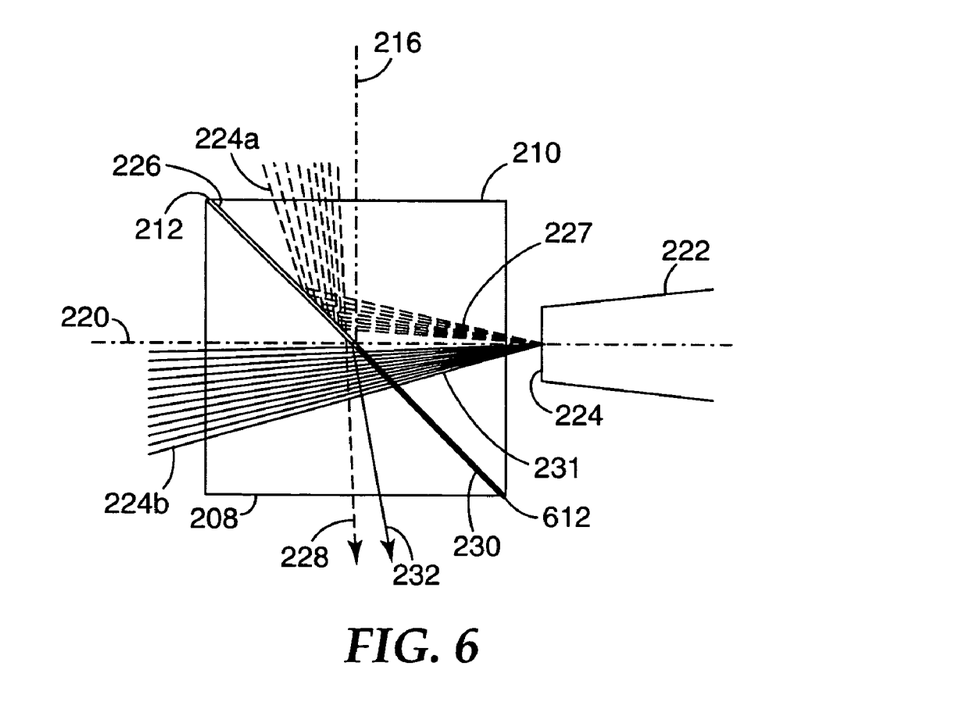
FIG. 6 schematically illustrates another embodiment of a light beam combining prism pair in accordance with principles of the present invention.

The prism pair 204 may be modified to reduce reflective losses for the light transmitted through the prisms 208 and 210, as is now discussed with reference to FIG. 6. An index matching material 612 may be placed in that portion of the air gap 212 where the light 224b passes through from prism 208 to 210. In this case, index matching means that the difference between the refractive index of the material 612 and the refractive index of the prisms 208 and 210 is less than the difference between the refractive index of the prisms 208 and 210 and the refractive index of air. Consequently, reflective losses at the interface between the prism 208 and the air gap 212 may be reduced. If the refractive index of the material 612 is the same as that for the prisms, 208 and 210, then there are no reflective losses for the light 224*b* passing from prism 208 to prism 210. The material 612 may be an optically transparent adhesive for holding the prisms 208 and 210 together.

Unless the refractive index difference between prism 210 and the material 612 is sufficiently large, it is important to maintain a high refractive index difference at the gap 212 between the prisms 208 and 210 at that region where the prism 210 totally internally reflects the light 224*a*, so as to preserve high efficiency in reflecting the light 224*a*.

In the approach just described with reference to FIG. 2, the light from the two light generators is combined by providing angular separation. Another approach to combining light from different light generators is now described with reference to FIG. 7A, in which the light from the different light generators is spatially separated. Light 702, shown in dashed lines, from a first light generator is incident on a turning reflector 704 that reflects the light 702 into the entrance aperture 706 of an integrator 708, such as a tunnel integrator. Light 710, shown in solid lines, is directly incident on the entrance aperture 706, without being reflected by the turning reflector 704. The turning reflector 704 extends only to cover a portion of the entrance aperture 706, so as to permit the light 710 to be directly incident on the aperture 706. The light 702 passes into substantially one part of the entrance aperture while the light 710 passes into substantially another part of the entrance aperture 706.

Figure 7A:
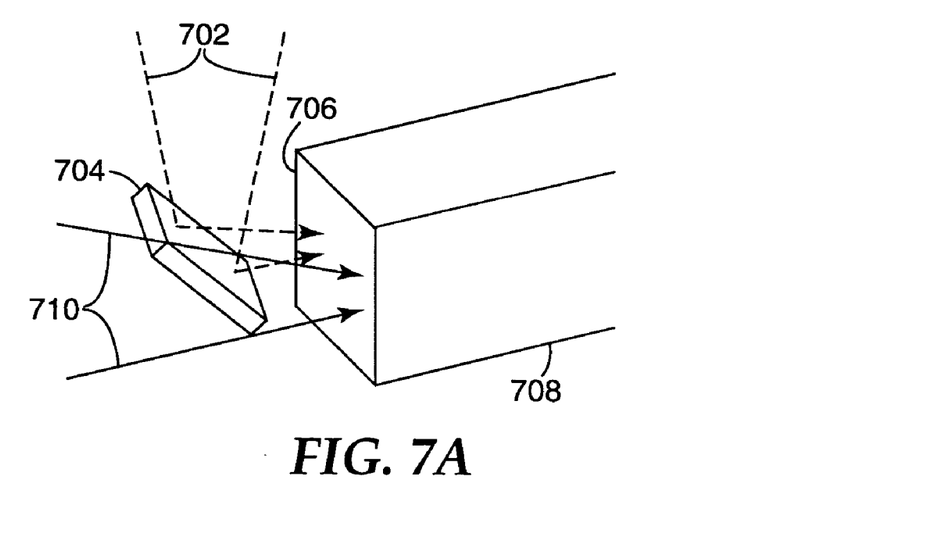
FIG. 7 schematically illustrates an embodiment of a combiner for combining light from two different light generators in a tunnel integrator, according to principles of the present invention.

The turning reflector 704 may be any suitable type of reflector including a front surface reflector, as illustrated, a rear surface reflector, a total internal reflector or the like. The turning reflector 704 may be positioned at an angle of about 45° so as to bend the light 702 through an angle of about 90° towards the entrance aperture 706, although this is not a necessary condition.

Figure 7B:
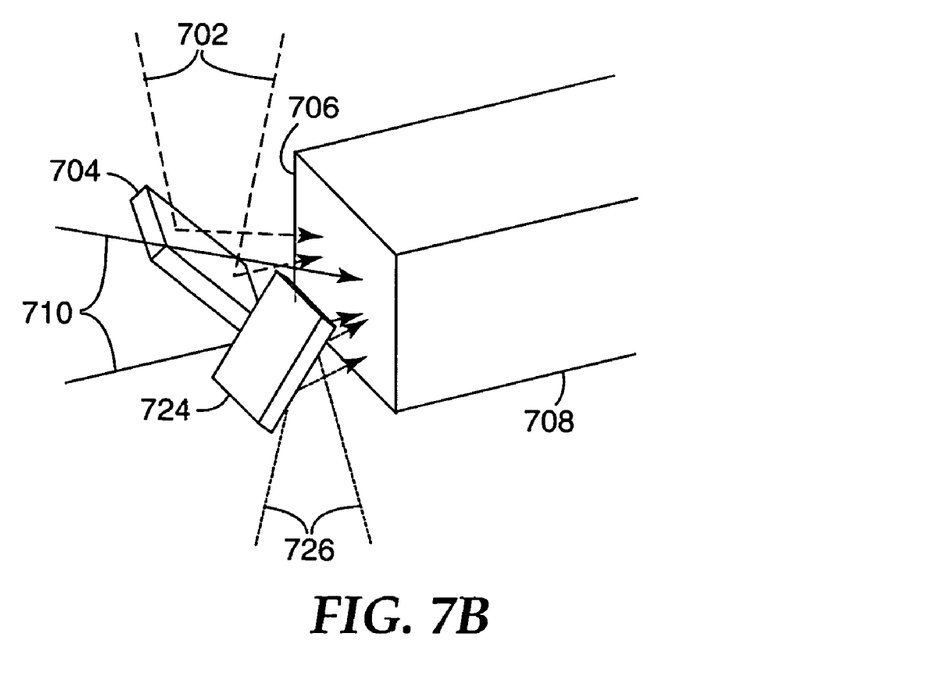

If desired, another turning reflector 724 may be placed in front of the entrance aperture 706, as is schematically illustrated in FIG. 7B, so as to reflect light 726 (shown in dotted line) from another light generator. In this case, light 702, light 710 and light 726 each pass into substantially different portions of the entrance aperture 706.

Thus, the approach of combining light from different sources illustrated in FIG. 7 is directed to using different parts of the entrance aperture for different beams, while the angular light distribution of the beams may overlap, or may even be the same. In the approach of combining light from different sources illustrated in FIGS. 2 and 3, the light beams from the two sources overlap at the entrance to the integrator, but have non-overlapping angular distributions. It will be appreciated that other approaches may be used for combining two or more light beams, for example, in which light from two separate light beams is combined in a way that permits partial spatial overlap of the beams at the entrance aperture to the integrator and partial overlap in the angular distribution of the two beams.

The approaches to combining light from different light generators may be used to combine light from different types of light generators including, but not limited to, arc lamps, filament lamps, other types of lamps and also solid state light generators. These approaches may be particularly useful for combining light from light generators where the light is first reflectively collected and directed to an integrator. An approach to reflectively collecting and directing light emitted from one or more light emitting diodes (LEDs) is described in greater detail in U.S. patent application Ser. No. 10/701,201, which is incorporated herein by reference.

One particular use for a light source that combines light from different light generators is to add light having one particular spectrum to light having another spectrum. Projection systems often use a high pressure mercury lamp as the light source. Some examples of these lamps include the UHP® family of lamps available from Philips Electronics, New York, N.Y., and the VIP® family of lamps available from Osram Sylvania, Danvers, Mass. These lamps typically have a short arc size, which permits high geometrical collection efficiency, and long lifetime. The spectrum of a high pressure mercury (HPM) lamp is shown as curve 802 in FIG. 8. The spectrum shows that large fractions of the output power exist in the blue region of the spectrum, particularly between about 400 nm and about 460 nm, and in the green/yellow region of the spectrum, between about 540 nm and 580 nm. The total fraction of the output power in the red region of the spectrum, for example from about 600 nm upwards, is relatively small.

It is important to maintain a desired color balance in the image projected by the projection system. Maintenance of a desired color balance generally involves the following steps in a three-panel projection system. First, the light from the lamp is separated into primary colors with color co-ordinates determined by a suitable standard. One common standard for projected images is the RP 145-1999 standard, set by the Society of Motion Picture and Television Engineers (SMPTE). This provides a desired level of color purity and can be achieved using dichroic filters in the projection system. To obtain the correct purity for the red and green channels, some of the yellow light needs to be removed. Second, after modulating the separated colored light beams with respective image display devices, the light is recombined and projected. At this stage, the amount of power in the blue, green and red light beams is adjusted so as to achieve a desired color temperature in the projected image. In addition to color temperature, another useful measure of color is the color co-ordinate of the white point, i.e. a mixture of all three beams, red, green and blue.

An example of the color co-ordinates for a typical high pressure mercury lamp are presented in Table I, for the individual channels and for different scenarios for mixing color on the screen. Some assumptions made in considering the data for Table I include: i) no Fresnel or polarization losses in the projection system, ii) no vignetting or apodization of the individual channels, and iii) the green channel uses light in one polarization with the red and blue channels using the other polarization. This last assumption permits partial overlap of the spectra of the blue and green channels, and thus the overall efficiency is increased. The first line in Table 1 presents idealized color co-ordinates (0.313, 0.329) associated with the SMPTE RP 145-1999 standard. The second line shows the actual values of the color co-ordinates (0.300, 0.304) of the light emitted by a Philips UHP-100 HPM lamp. Line 3 shows the different color co-ordinates for the three separated color bands, blue, green and red, for light generated by the UHP-100 lamp. If we assume unity weighting factors for each of the three color bands, as shown in line 4, then the white light on the screen has the color co-ordinates as shown in line 5, (0.26, 0.30). This white light has different co-ordinates from the white SMPTE standard of line 1. The white light on the screen is also different in color from what was emitted from the lamp, since some light is discarded in the process of separating the light into different color bands. The weighting values shown in the sixth line are those values that result in white light on the screen having color co-ordinates as shown on line 7, similar to that of the reference standard. Thus, to produce white light that conforms to the SMPTE standard, only 46.1% of the green light and 36.5% of the blue light is used, while all the red light is used.

TABLE 1

Color Co-ordinates for Uncorrected and Corrected Light from HP Mercury Arc Lamp

|  | Blue | | Green | | Red | | White | |
|---|---|---|---|---|---|---|---|---|
|  | x | y | x | y | x | y | x | y |
| 1. SMPTE | 0.155 | 0.07 | 0.31 | 0.595 | 0.63 | 0.34 | 0.313 | 0.329 |
| 2. from Hg source |  |  |  |  |  |  | 0.300 | 0.304 |
| 3. Color purity | 0.147 | 0.081 | 0.326 | 0.59 | 0.638 | 0.346 |  |  |
| 4. Weighting factor | 1 | | 1 | | 1 | |  |  |
| 5. On the screen |  |  |  |  |  |  | 0.26 | 0.30 |
| 6. Weighting factor | 0.365 | | 0.461 | | 1 | |  |  |
| 7. On the screen |  |  |  |  |  |  | 0.313 | 0.329 |

Accordingly, to achieve a desirable color temperature, a significant fraction of the light emitted from the high pressure mercury lamp is discarded. The reason for this is that the high pressure mercury lamp produces relatively little red light compared to the green and blue light. It is desirable, therefore, to supplement the light from a high pressure mercury lamp with red light from some other source. The addition of red light to the output from the high pressure mercury lamp effectively increases the amount of red light in the projected image, and thus the amount of blue and green light that needs to be discarded to achieve the desired white color co-ordinate is reduced. In consequence, the overall system efficiency is increased.

Figure 8:
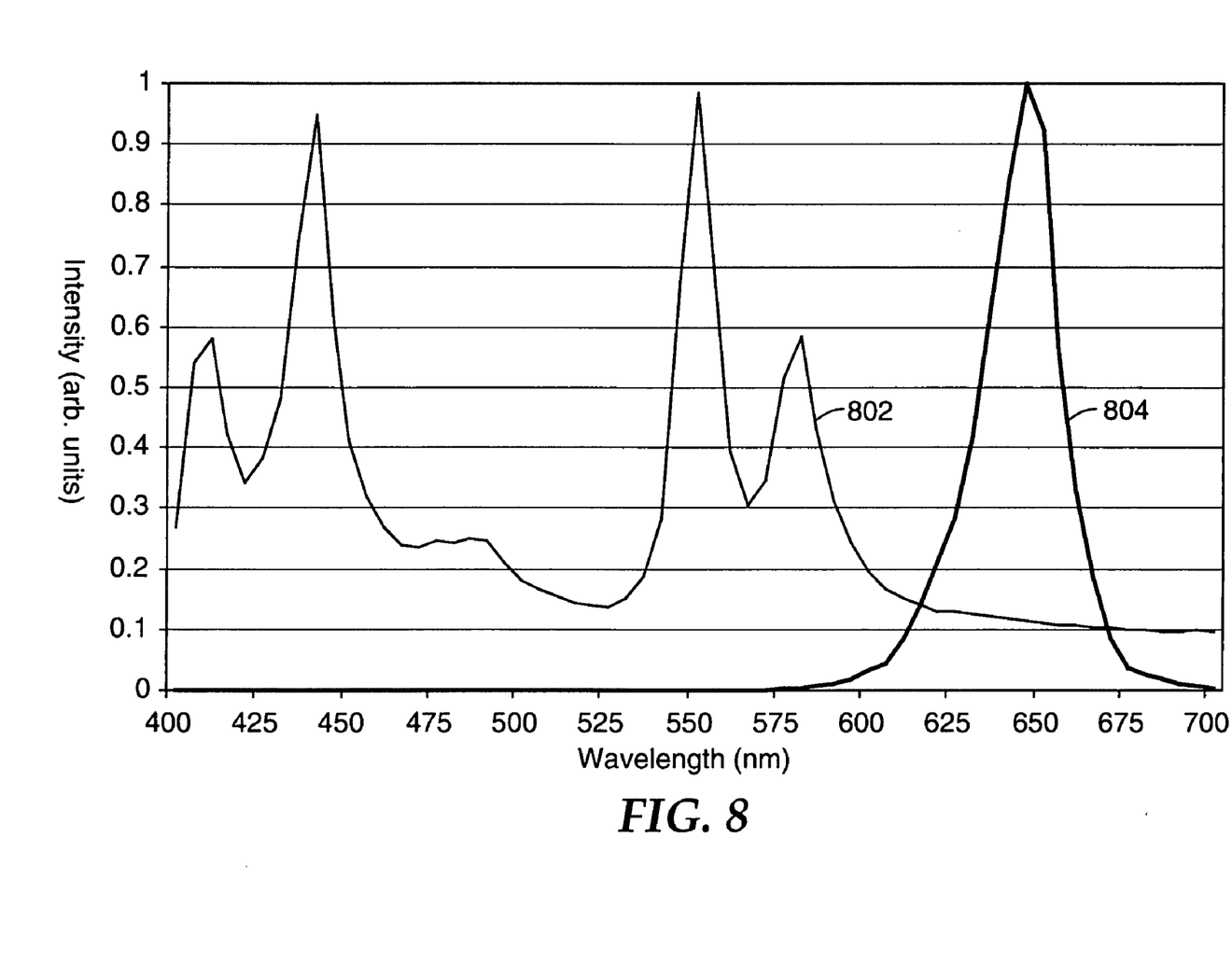
FIG. 8 presents a graph showing normalized output light spectra of a high pressure mercury lamp and of a red light emitting diode (LED)

The different approaches for combining light from different light generators discussed above may be used in combining red light from one or more LEDs with the light from a discharge lamp. An example of a normalized spectrum of light from a red LED, centered at about 650 nm, is shown in FIG. 8 as curve 804.

Figure 9:
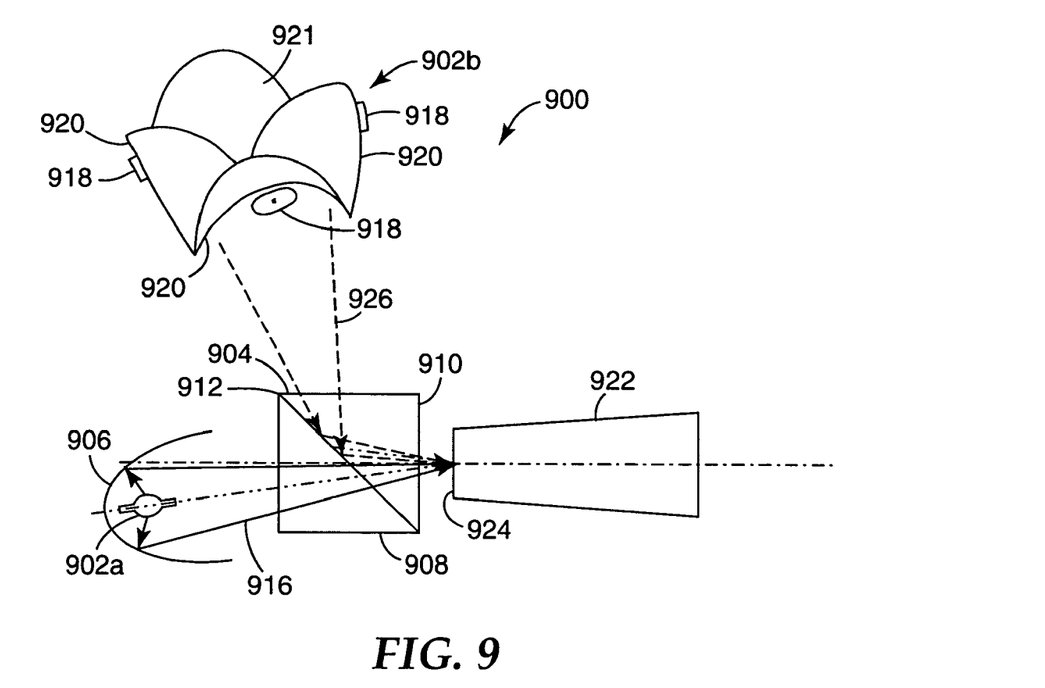
FIG. 9 schematically illustrates a light source for a projection system in which light from a lamp and from a LED source is combined using a prism pair according to an embodiment of the present invention.

One embodiment of a light source 900 that uses combined light from a discharge lamp 902a and an LED-based light source 902b is schematically illustrated in FIG. 9. The source 900 uses a prism pair 904, formed from prisms 908 and 910, with an air gap 912 therebetween to combine the light from the discharge lamp 902a and the LED-based light source 902b, in a manner similar to that illustrated in FIG. 2.

A reflector 906a is provided with the discharge lamp 902a to collect the light 916 from the lamp 902a and direct the light 916 (shown in solid lines) towards the entrance aperture 924 of an integrator 922, for example a tunnel integrator. The light 916 is transmitted through the two prisms 906 and 908. The LED-based light source 902b employs one or more LED units 918 that each comprise an LED emitter and a lens, typically a half-ball lens. The lens may comprise the domed encapsulant that is commonly associated with an LED. The light emitted from the LED emitter is reflectively collected by a respective reflector 920 that has a reflecting surface conforming to a surface of revolution about a revolution axis. This is described in greater detail in U.S. patent application Ser. No. 10/701,201, incorporated herein by reference.

The LED-based light source 902b may include more than one LED unit 918 with respective reflectors 920. The reflectors 920 may each form part of a reflector body 921. The reflector body 921 may be formed as an integral body that contains the different reflectors 920.

The illustrated embodiment shows a light source 902b that comprises four LED units 918. It will be appreciated, however, especially in view of the teaching contained in U.S. patent application Ser. No. 10/701,201 that different numbers of LED units may be used. For example, the light source 902b may include six, eight or sixteen LED units. It should be noted, however, that use of these examples is not intended to limit the number LED units that may be used in the light source 902b, and that the examples are presented for illustration purposes only.

Light 926 (shown in dashed lines) from the LED-base light source 902b is directed by the reflector 920 to the prism pair 904. The direction of propagation to the prism pair 904 is such that the light 926 is substantially totally internally reflected at the interface between the prism 908 and the air gap 912, towards the integrator entrance aperture 924. Thus, the light from one or more LEDs may be efficiently collected and combined with light from an arc lamp.

Figure 10:
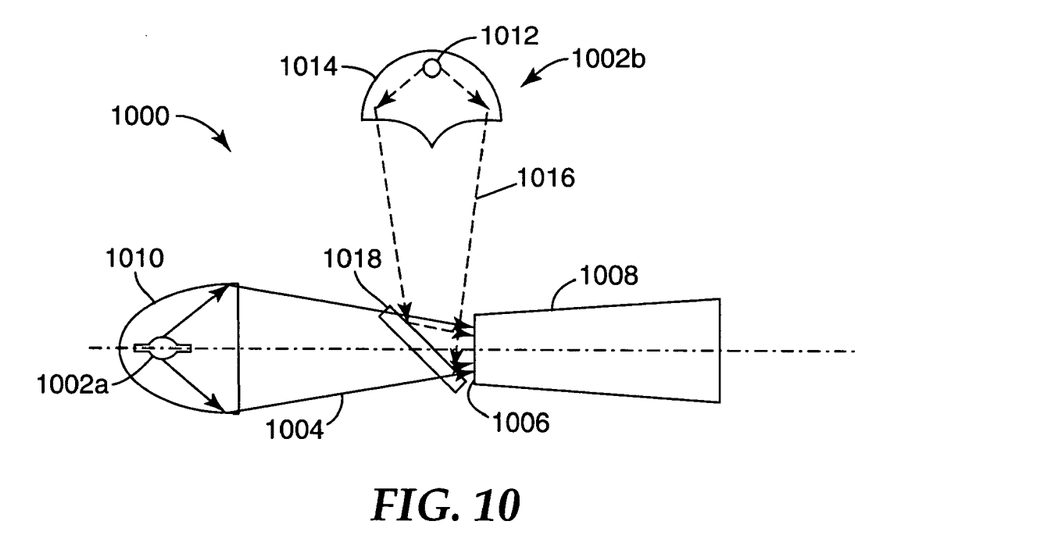
FIG. 10 schematically illustrates a light source for a projection system in which light from a lamp and from a LED source is combined using mirror and tunnel integrator according to an embodiment of the present invention.

Another approach for a light source 1000, schematically illustrated in FIG. 10, is similar in some ways to the embodiment discussed with respect to FIG. 7A, with light in one of the beams being generated in an LED-based light source. The light source 1000 comprises an arc lamp 1002a whose light 1004 is collected and directed to the entrance aperture 1006 of an integrator 1008 by a reflector 1010. The reflector 1010 may be ellipsoidal, or may be non-ellipsoidal.

An LED-based light source 1002b, comprising one or more LED units 1012 whose light is collected and directed by one or more reflectors 1014, directs light 1016 to a turning reflector 1018 that turns the light 1016 into the entrance aperture 1006 of the integrator 1008. Thus, the light 1004 from the lamp 1002a and the light 1016 from the LED units 1012 illuminate substantially different portions of the entrance aperture 1006.

It will be appreciated that different arrangements of the light sources shown in FIGS. 9 and 10 may be used to combine light from LED units with light from an arc lamp. For example, the arc lamp 902a may be positioned so that its light is reflected within the prism pair 904, while the LED-based light source 902b is positioned so that its light is transmitted through the prism pair 904. In addition, the arc lamp 1002a may be positioned so that its light is turned by the turning reflector 1018 towards the integrator 1008, while the LED-based light source 1002b is positioned so that its light is transmitted into the integrator 1008 directly.

Figure 11:
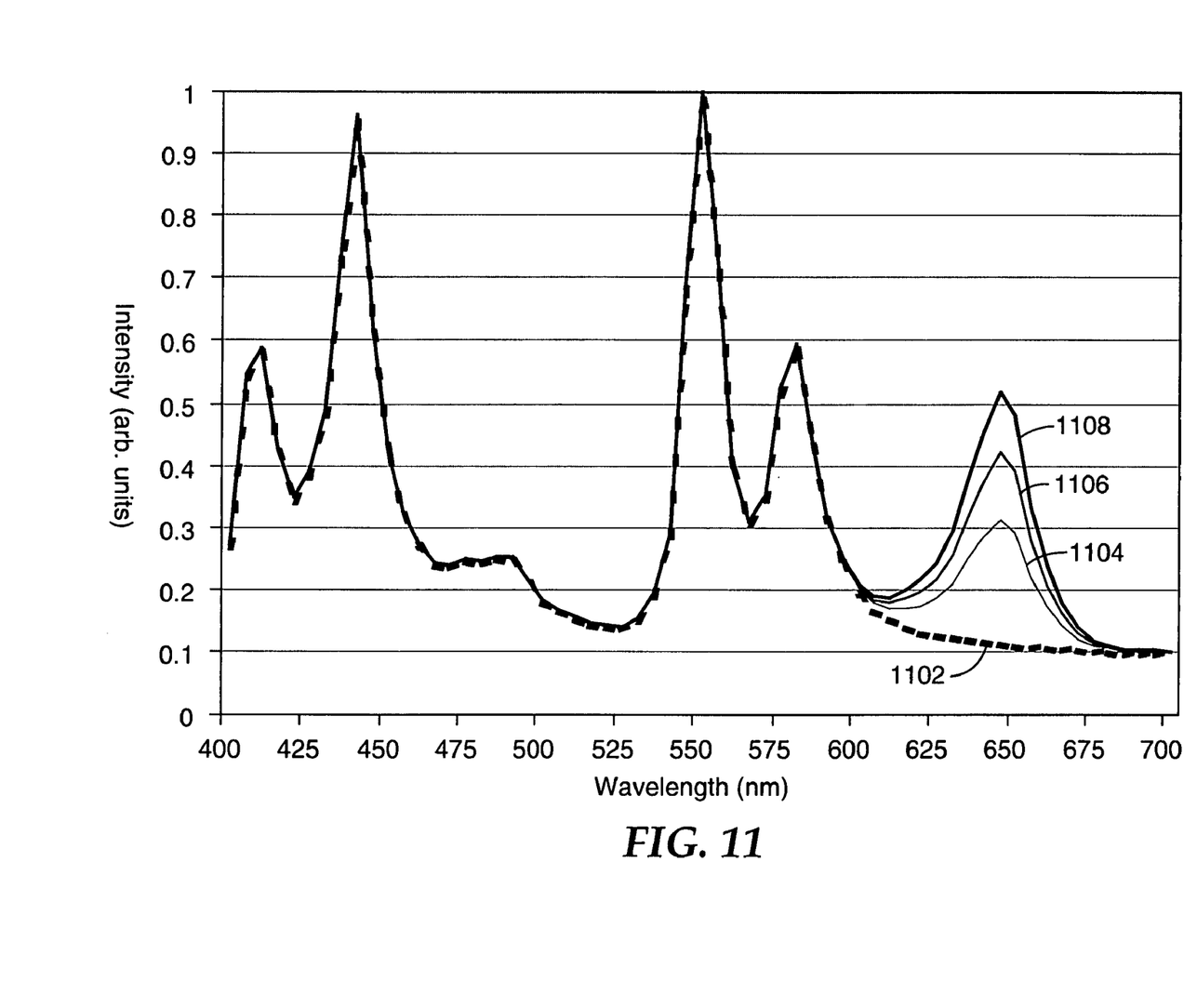
FIG. 11 presents composite spectra of illumination light beams generated by a high pressure mercury lamp and an LED source having different numbers of LEDs, in accordance with an embodiment of the present invention.

FIG. 11 presents a comparison of the spectrum of light produced by a high pressure mercury arc lamp, curve 1102, with the composite spectra of light produced by a mercury lamp augmented by light produced by a number of red LEDs. Curve 1104 is the calculated spectrum when the mercury lamp is augmented by four LEDs, while curves 1106 and 1108 show spectra when the mercury lamp is augmented by eight and sixteen LEDs respectively. As can be seen, the use of red LEDs significantly enhances the amount of light in the red portion of the spectrum. Consequently, less green and blue light has to be discarded in order to achieve the desired color balance, and the use of the light emitted from the lamp is more efficient. This is further shown in Table II, which lists the total collection efficiency for each assembly of LEDs and also lists the lumens efficiency for the augmented source compared to the mercury lamp alone (100%). The collection efficiency for the assembly of LEDs is normalized relative to the total light emitted by a single LED. Thus, when the mercury lamp is augmented by four LEDs, the total brightness of white light complying with the SMPTE RP 145-1999 standard is 14% higher than when the mercury lamp is used alone.

TABLE II

Comparison of White Light Efficiency for Light Sources Augmented with Different Numbers of LEDs

| No. of LED units | Unit collection efficiency | Lumens efficiency for balanced white light |
| --- | --- | --- |
| 0 | n/a | 100% |
| 4 | 256% | 114% |
| 8 | 394% | 120% |
| 16 | 518% | 124% |

The values presented in Table II were calculated using the following assumptions. Each LED comprised a flat emitting area of 500 μm×500 μm encapsulated in a PMMA half-ball lens having a radius of 2.8 mm. Each LED was assumed to be a Lambertian emitter. The light from the LEDs was combined into a rectangular target area 6.4 mm×12.8 mm, within a collected solid angle of ±22°. It is seen from Table II that the lumens efficiency does not increase linearly with the number of LEDs. This is due, at least in part, to the fact that the collection area has a limited solid angle and each LED has an associated reflector of a finite size. Consequently, as the number of LEDs increases, it becomes increasingly more difficult to achieve the same light gains by squeezing more LEDs into the ±22° cone subtended by the target area.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. A projector system, comprising:
   a light source comprising
   a first light generator producing first light and a first reflector disposed to collect at least part of the first light and to direct the collected first light in a first direction,
   a second light generator producing second light and a second reflector disposed to collect at least part of the second light and to direct the collected second light in a second direction, and
   a light combiner that combines the first light and the second light to produce a combined light beam;
   at least one image display unit illuminated by at least a part of the combined light beam, the at least one image display unit imposing an image on the at least a part of the combined light beam to form an image beam; and
   a light homogenizer unit between the light source and the at least one image display unit to homogenize the combined light beam;
   wherein the first light enters the homogenizer unit with a first angular distribution and the second light enters the homogenizer unit with a second angular distribution substantially non-overlapping with the first angular distribution.

2. A system as recited in claim 1, further comprising a projector lens unit that projects the image beam.

3. A system as recited in claim 1, further comprising at least one polarizing beamsplitter, the combined light beam being incident on the at least one image display unit via the polarizing beamsplitter, the at least one image display unit being a reflective image display unit and producing a reflected image beam, the reflected image beam being separated from the combined light beam by the polarizing beamsplitter.

4. A system as recited in claim 1, wherein the homogenizer unit is a tunnel integrator.

5. A system as recited in claim 4, wherein the tunnel integrator comprises the light combiner, the first and second light generators directing the first and second lights respectively into the tunnel integrator and the combined beam emerging from the tunnel integrator.

6. A system as recited in claim 4, further comprising an image relay system to relay an image of an output of the homogenizer unit to the at least one image display unit.

7. A system as recited in claim 4, wherein the tunnel integrator has an entrance aperture and an exit aperture, the entrance aperture having a size different from a size of the exit aperture.

8. A system as recited in claim 7, wherein the tunnel integrator is a trapezoidal tunnel integrator.

9. A system as recited in claim 1, wherein the first light enters an entrance aperture of the homogenizer unit at a first aperture portion and the second light enters the entrance aperture at a second aperture portion different from the first aperture portion.

10. A system as recited in unit as recited in claim 1, wherein the at least one image display unit comprises at least two image display units and further comprising a color separator disposed to separate the combined beam into at least two beams of different color bands to illuminate the at least two image display units with respectively light of different color bands.

11. A system as recited in unit as recited in claim 10, wherein the color separator receives image light in the different color bands from the at least two image display units and combines the image light in the different color bands into the image beam that is projected by the projector lens unit.

12. A system as recited in unit as recited in claim 1, further comprising a controller coupled to the at least one image display unit to control an image produced by the at least one image display unit.

13. A light source unit for a projection system, comprising:
   a first light generator producing first light and a first reflector disposed to collect at least part of the first light and to direct the collected first light in a first direction;
   a second light generator producing second light and a second reflector disposed to collect at least part of the second light and to direct the collected second light in a second direction;
   a light combiner that combines the first light and the second light to produce a combined light beam, the light combiner comprising a prism pair formed from first and second prisms, the first light being substantially totally internally reflected within the first prism and the second light being substantially transmitted through the first and second prisms to form a combined light beam; and
   an integrator, the combined, light beam entering the integrator at an entrance aperture of the integrator.

14. A unit as recited in claim 13, wherein the second light generator comprises at least one light emitting diode (LED).

15. A unit as recited in claim 14, wherein the second reflector comprises a reflecting surface conforming to a surface of revolution about a revolution axis, the at least one LED unit having an LED axis non-parallel to the revolution axis.

16. A unit as recited in claim 13, wherein the first light generator comprises a high pressure mercury lamp.

17. A unit as recited in claim 16, wherein the second light generator comprises a high pressure mercury lamp.

18. A unit as recited in claim 13, further comprising an index matching layer disposed between the first and second prisms, the second light substantially transmitted through the first and second prisms passing through the index-matching layer.

19. A unit as recited in claim 18, wherein the index-matching layer is an adhesive layer.

20. A unit as recited in claim 18, wherein the first light totally internally reflects within the first prism at a surface area substantially free of the refractive index-matching layer.

21. A unit as recited in claim 13, wherein the integrator is a tunnel integrator.

22. A unit as recited in claim 21, wherein the tunnel integrator is a tapered integrator.

23. A light source unit for a projection system, comprising:
a first light generator unit producing a first light beam having a first cone angle, light in the first light beam having a relatively broad spectrum;
a second light generator unit producing a second light beam separated from the first light beam, the second light beam having a second cone angle substantially equal to the first cone angle, light in the second light beam having a relatively narrow spectrum; and
a light integrator disposed to receive both the first and second light beams and to produce a combined output beam.

24. A unit as recited in claim 23, wherein the first light generator unit comprises a mercury discharge lamp.

25. A unit as recited in claim 23, wherein the second light generator unit comprises at least one light emitting diode (LED) unit.

26. A unit as recited in claim 25, wherein light from the at least one LED unit is reflected as the second light beam by a reflector, the reflector having at least one reflecting surface conforming to a surface of revolution about a revolution axis non-parallel to an LED axis of the at least one LED unit.

27. A unit as recited in claim 23, further comprising a first reflecting surface disposed proximate an entrance aperture of the light integrator, one of the first and second light beams being directed into the entrance aperture via reflection at the first reflecting surface.

28. A unit as recited in claim 23, wherein the first light beam enters the light integrator with a first angular distribution and the second light beam enters the light integrator unit with a second angular distribution substantially non-overlapping with the first angular distribution.

29. A unit as recited in claim 23, wherein the first light beam enters an entrance aperture of the light integrator at a first aperture portion and the second light beam enters the entrance aperture at a second aperture portion different from the first aperture portion.

30. A unit as recited in claim 27, further comprising a prism pair comprising first and second prisms, the first prism having a totally internally reflecting surface that comprises the reflecting surface, light in the other of the first and second light beams being transmitted through both the first and second prisms.

31. A unit as recited in claim 27, wherein, light in the other of the first and second light beams enters the entrance aperture without passing through the reflecting surface.

32. A unit ac recited in claim 31, wherein the reflecting surface comprises a first mirror.

33. A unit as recited in claim 31, further comprising a second reflecting surface disposed proximate the entrance aperture, light in the one of the other of the first and second light beams and a third light beam being reflected off the second reflecting surface into the entrance aperture.

34. A unit as recited in claim 23, wherein the integrator is a tunnel integrator.

35. A unit as recited in claim 34, wherein the tunnel integrator is a tapered tunnel integrator.

36. A unit as recited in claim 23, further comprising an imager unit disposed to receive the combined output beam, and to produce an image beam, and a projection lens unit disposed to project the image beam.

37. A unit as recited in claim 36, wherein the imager unit includes at least one reflective image display unit and at least one respective polarizing beamsplitter, at least pan of the combined output beam passing to the at least one reflective image display unit via the at least one respective polarizing beamsplitter, image light from the at least one reflective image display unit being separated from the at least part of the combined output beam by the at least one respective polarizing beamsplitter.

38. A unit as recited in claim 37, wherein the at least one reflective image display unit comprises first, second and third reflective image display units, and the imager unit includes a color separation unit disposed to separate the combined output beam into first, second and third color bands directed respectively to the first, second and third reflective image display units.

39. A unit as recited in claim 36, further comprising a controller coupled to at least one image display device in the image unit, to control an image produced by the at least one image display device.

* * * * *

UNITED STATES PATENT AND TRADEMARK OFFICE
CERTIFICATE OF CORRECTION

PATENT NO.        : 7,090,357 B2
APPLICATION NO.   : 10/745000
DATED             : August 15, 2006
INVENTOR(S)       : Simon Magarill It is certified that error appears in the above-identified patent and that said Letters Patent is hereby corrected as shown below:

Col. 2, line 30, after "angle." delete "the" and insert -- The --, therefor.

Col. 9, line 53, delete "906*a*" and insert -- 906 --, therefore.

Col. 9, line 57, delete "906" and insert -- 910 --, therefore

Col. 12, line 66, in Claim 13, delete "combined," and
insert -- combined --, therefor.

Col. 14, line 19, in Claim 32, delete "ac" and insert -- as --, therefor.

Col. 14, line 37, in Claim 37, delete "pan" and
insert -- part --, therefor.

Signed and Sealed this

Sixteenth Day of January, 2007

JON W. DUDAS
*Director of the United States Patent and Trademark Office*